May 19, 1936.  L. L. ISENHOUR  2,041,184
METHOD FOR THE PRODUCTION OF FUROIC ACID
Filed April 30, 1932   3 Sheets-Sheet 1
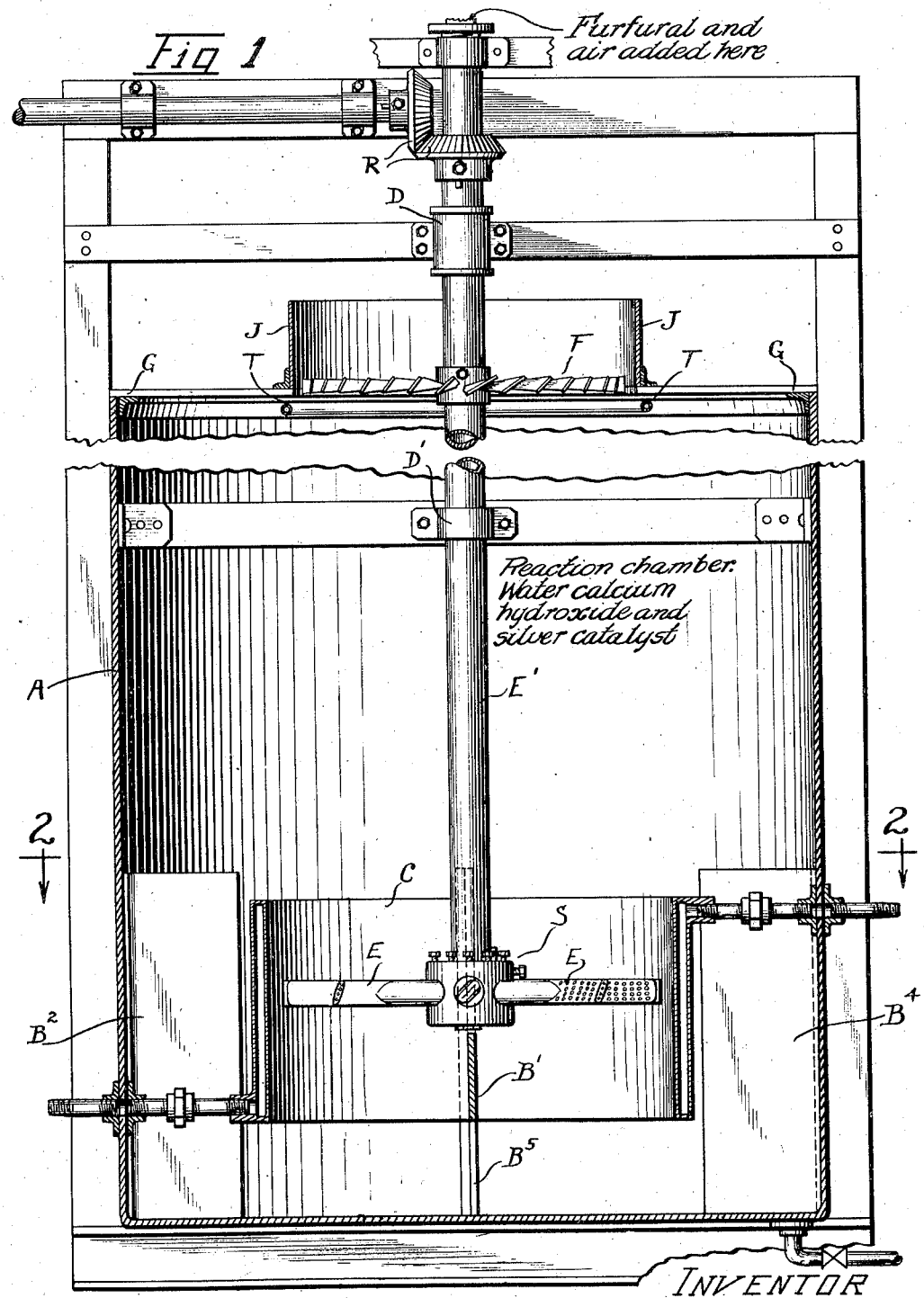

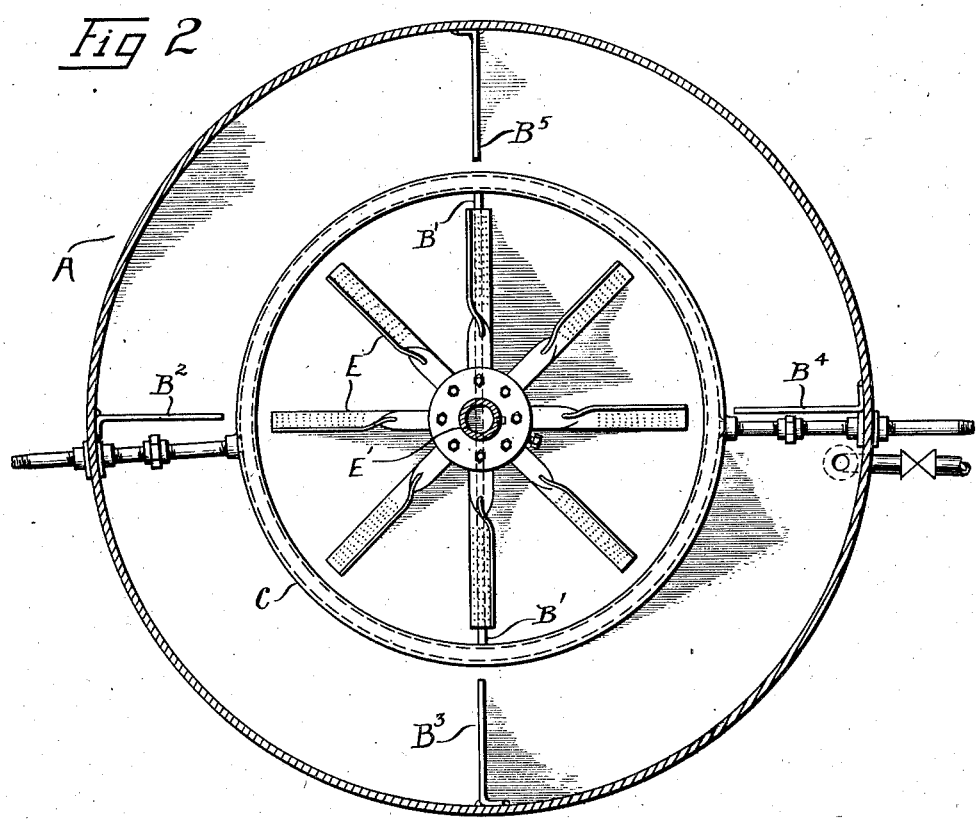
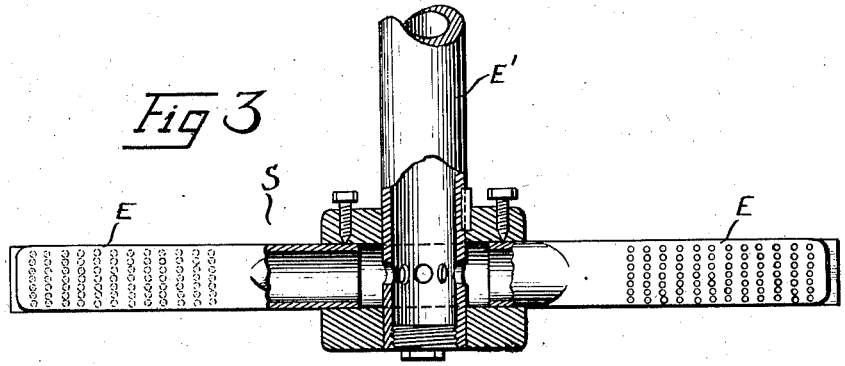
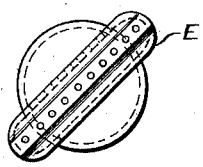

May 19, 1936.   L. L. ISENHOUR   2,041,184
METHOD FOR THE PRODUCTION OF FUROIC ACID
Filed April 30, 1932    3 Sheets—Sheet 3
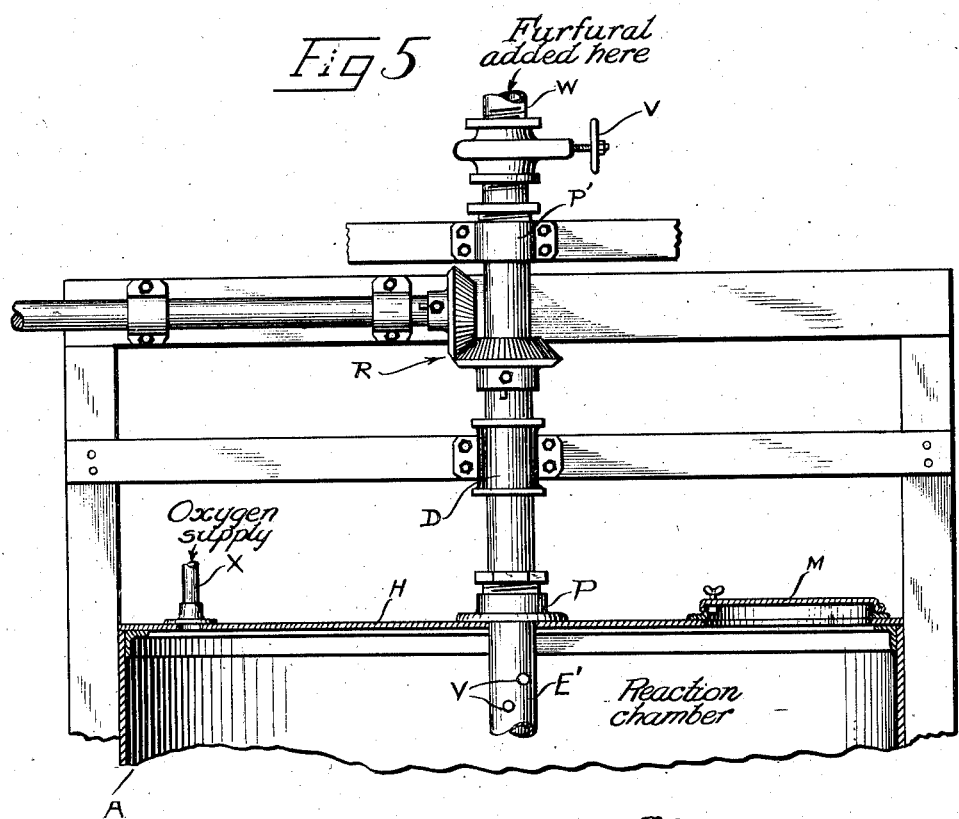
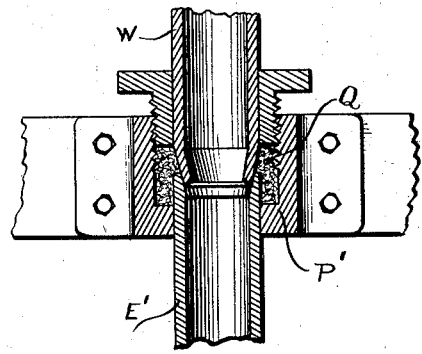
INVENTOR
Lloyd L. Isenhour
Jones, Addington, Ames, & Seibold.
ATTORNEYS Patented May 19, 1936

2,041,184

UNITED STATES PATENT OFFICE 2,041,184

METHOD FOR THE PRODUCTION OF FUROIC ACID

Lloyd L. Isenhour, Chicago, Ill., assignor to The Quaker Oats Company, Chicago, Ill., a corporation of New Jersey Application April 30, 1932, Serial No. 608,417

12 Claims. (Cl. 260—54)

My invention relates to a method or process for the production of furoic acid from furfural and to a new apparatus that may be employed for this process.

One of the objects of my present invention is to provide a new process for the economical production of furoic acid from furfural in substantially higher yields than has been possible by the methods known and used heretofore.

Another object of my invention pertains to a process whereby the oxidation of furfural to procure furoic acid may be economically accomplished by the use of gaseous oxygen as an oxidizing agent.

Previous methods for the making of furoic acid have involved the production of considerable quantities of by-products with consequent relatively low yields of furoic acid and, in addition, have required the utilization of large quantities of expensive chemicals as oxidizing agents.

In my new methods I oxidize furfural to furoic acid by bringing a warm alkaline mixture of furfural, water, and a catalyst or activator into intimate contact with gaseous oxygen either pure or in other suitable mixture, such as atmospheric air.

In my process it is desirable that the gaseous oxygen and the liquid reaction mixture shall be brought into very intimate contact, and for this purpose I may use any mechanical device which is capable of intimately mixing a gas and a liquid. I can, for example, use apparatus similar to a dish-washing machine consisting of a cylindrical tank with an impeller designed to throw liquid upward from the bottom in a fine spray or other apparatus capable of intimately mixing a gas and a liquid.

However, for the economical practice of my process I prefer to use apparatus of the general character that I have developed for this purpose and which is herein described.

For a better understanding of the nature and scope of my present invention, reference may be had to the accompanying drawings wherein:

Figure 1 is a diagrammatic representation partly in section and partly in elevation of my apparatus;

Fig. 2 is a cross-section of the device shown in Fig. 1 taken along the line of 2—2;

Fig. 3 is an enlarged and more detailed view showing the stirrer illustrated in Figs. 1 and 2;

Fig. 4 is an end view of one of the blades secured to the stirrer shown in Fig. 3;

Fig. 5 illustrates a modified form of the apparatus shown in Fig. 1 which is particularly adaptable when pure oxygen is used to oxidize the furfural; and Fig. 6 is a detailed view, partially in elevation and partially in section of the movable and airtight joint connection or stuffing box employed in the modified form of apparatus of Fig. 5.

The apparatus that I have illustrated in the drawings constitutes a part of my instant invention, as well as the process, both of which are to be hereinafter described.

The apparatus of Figs. 1, 2, and 3 comprises a cylindrical tank A, which may conveniently be of a capacity equal to about three times the volume of the reaction mixture that I propose to employ. The tank A adjacent to its bottom portion is fitted internally with a jacketed cylinder C that has a cross-sectional area equal to about 0.4 of the cross-sectional area of the tank A. This cylinder C serves as a guide to force a positive circulation of the contents of the tank when it is being stirred. The cylinder C has a height of about 0.3 of the depth of the tank, and it is supported from the bottom of the tank at a distance of about three-tenths of the radius of the tank. This allows for an even rate of liquid flow down through the cylinder and out under it.

A specially designed stirrer S, which is shown in detail in Fig. 3, is fitted to rotate within the upper half of the inner cylinder C. The stirrer shaft E' at its lower end is provided with a plurality of spaced blades E which are hollow. The shaft E' of the stirrer is likewise hollow so that there is a free opening provided from the top of the shaft E' through the tip of each hollow blade E, since these blades communicate with the hollow shaft E' as shown in Fig. 3. The stirrer blades E are pitched at an angle of approximately 30° from the horizontal and in such direction that they will impart a downward thrust to the liquid when they are rotated. The upper face and tip of each stirrer blade E are perforated with ¼ in. holes, as shown in Figs. 1, 3, and 4. The stirrer shaft E' is supported in the bearings D and D'. As mentioned above, the upper end of shaft E' is left open so that upon rotation air is drawn down it and distributed through the contents of the tank, due to the aspirator effect of the liquid passing by the perforations formed in the stirrer blades. If a greater volume of air is desired, compressed air may be applied at the top of the shaft.

A baffle plate B', as shown particularly in Figs. 1 and 2, is placed centrally within the cylinder C below the stirrer blades E to bisect the cylinder. Four baffle plates $B^2$, $B^3$, $B^4$, and $B^5$, shown as being equally spaced, are placed between the cylinder C and the tank A. These plates are shown as extending from the bottom of the tank A so as to subtend the cylinder C and extend an appreciable distance above the upper periphery of the cylinder C. The aforesaid baffle plates increase the efficiency of the stirring by preventing a too great swirling effect upon the reaction mixture.

An annular flange G circumscribes a collar J and on its outer periphery coincides with the upper perimeter of the tank A. A heating element in the form of a coil T encircles the lower end of the collar J. This heating element may be either a steam coil or a suitable electrically heated element. Mounted on the stirrer shaft E' and within the lower portion of the collar J is a fan F. The combined action of the fan and the heating element T tends to break and disrupt any foam which may be pushed up out of the tank A from the reaction mixture. Any suitable drive may be employed for rotating the shaft E' and I have illustrated this as being accomplished by the bevel gear train R.

In practicing my process by utilizing the aforesaid apparatus, I may proceed as follows:

An activator is prepared by precipitating silver as will be described below. This is then further reduced to the catalytic form by the addition of furfural in the reaction mixture. In preparing the silver catalyst, I proceed as follows: To 100 parts by weight of hot water are added 0.8 parts caustic soda. This solution is violently stirred and 3.21 parts of silver nitrate, $AgNO_3$, dissolved in 50 parts of hot water are slowly added. The precipitate is filtered off, washed free of nitrates with hot water, and then added to the reaction mixture without drying.

Into the tank A are introduced 100 parts by weight of water at a temperature of 55 to 60° C., 2.5 parts of the above described catalyst, and 3.2 parts quick lime. The stirrer shaft E' is then rotated and 12 parts of furfural are slowly introduced, preferably through the hollow stirrer shaft E' and stirrer blades E, from which it is carried into the catalytic mixture with the air. The rate of introduction of this furfural and air is so controlled, in any suitable manner well known in the art, that the furfural is quickly oxidized and there is no accumulation of it in the solution. The peripheral speed of the stirrer must be great enough to give a satisfactory aspirating effect. With one machine now in use this approximates 15,000 to 20,000 inches per minute. The reaction mixture contained in the tank A should be kept within the temperature limits of 45 to 60° C., and to this end suitable auxiliary heating or cooling means for the tank A may be employed, such as through the medium of the jacketed cylinder C which may be supplied with hot steam or hot water, or with a suitable cooling medium. With the active catalyst and the proper rate of introducing furfural, the temperature of the reaction mixture will remain approximately in the range of 50 to 55° C., and under such a circumstance it will not be necessary to use auxiliary temperature control for the tank A. The apparatus is run, after all the furfural has been added, until the mixture gives only a faint positive test for furfural. The mixture is then removed and filtered to separate the catalyst and any excess lime. The filtered liquor is heated to 90 to 95° C. and acidified with 5.5 parts of sulfuric acid (66° Bé.) in 6 parts of water. The calcium sulphate is filtered from the hot liquor and washed.

The solution of furoic acid is cooled to 10° C. The greater portion of the furoic acid crystallizes here and is filtered off. The mother liquor and washings are distilled to one-tenth volume through a short fractionating column which prevents undue steam distillation of furoic acid. It is desirable to add a little decolorizing carbon to the solution during the concentration. This is filtered off hot with any calcium sulphate which has separated. Cooling the filtrate yields another portion of the acid. Further concentration of the mother liquors may yield additional furoic acid. I have found the yield of furoic acid from the above process to be extremely high and in the neighborhood of from 85 to 90% of the theoretical.

The activator or silver catalyst may be regenerated after use in the reaction by boiling 30 minutes with 8 parts 3% caustic soda solution, the same being stirred vigorously during the heating. When filtered and washed free of caustic, the silver catalyst is again ready for use. Other fixed alkalies, such as potassium hydroxide, may be substituted for the sodium hydroxide. If the silver catalyst becomes so contaminated that the regeneration thereof by means of caustic is not effective, it can be completely dissolved in nitric acid and reprecipitated as silver oxide.

This silver activator requires the presence of an alkaline agent in order to efficiently oxidize furfural. Ordinary lime is a convenient alkaline agent since it automatically maintains a degree of alkalinity in the solution that is favorable to the reaction. Other alkaline agents may be used, however. The following example describes my process when sodium hydroxide is substituted for lime, and this latter method is especially convenient for the preparation of sodium furoate although furoic acid may be prepared as hereinafter described.

To 100 parts of water at 50° C. in the oxidizer, add 3 parts of the freshly prepared silver activator and 4.5 parts of caustic soda. Twelve (12) parts of furfural are then added through the stirrer of the oxidizer at such a rate that a concentration of unoxidized furfural does not build up in the solution. Any common qualitative test for furfural may be used to determine this condition. When the rate of addition is not too fast, a test portion of the solution should show only a faint pink coloration upon addition of aniline acetate. The remainder of the oxidation is carried out as previously described, and the sodium furoate solution is filtered from the catalyst. If sodium furoate is to be the final product, the moisture is removed from the sodium furoate by evaporation and drying.

If furoic acid is to be produced, the filtrate containing the sodium furoate is evaporated to a solid content of approximately 25%. To the hot solution are added 7.1 parts 60° Bé. sulfuric acid and the mixture is allowed to cool slowly to room temperature without any agitation. It should not stand over eight to ten hours or the sodium sulfate will begin to separate from the supersaturated solution. The furoic acid is then filtered and washed with a few parts of cold water. The furoic acid is dried at 50 to 60° C. and atmospheric pressure. The yield of furoic acid should be 75 to 80% of the theoretical.

The above oxidation is more satisfactory if the caustic soda is added at the same proportionate rate as the furfural, maintaining a concentration of 0.05 to 0.15%. If these conditions are maintained there is less resin formation and the catalyst does not deteriorate so rapidly.

To oxidize furfural with pure oxygen, a modified form of the apparatus as shown in Figs. 5 and 6 is used; otherwise the general procedure may be the same as that when air is the oxidizing agent, as in the apparatus of Figs. 1, 2, and 3. In Fig. 5 the fan F, the collar J, and the annular flange G at the top of the tank A of the apparatus of Fig. 1 are substituted by the cover H bearing a stuffing box P in the center thereof and through which the stirrer shaft may pass. This forms a gas-tight apparatus and prevents loss of oxygen. A connection X is provided at the top of the tank A, which may communicate with any suitable source of oxygen supply. A manhole M is placed in the top, through which the lime, catalyst, water, etc., that comprise the reaction mixture, are introduced into the tank A. The manhole M also provides access for cleaning the inside of the tank. In this specific apparatus the shaft E' is provided within the tank A with a plurality of holes V' (preferably four), of a diameter approximately $\frac{1}{10}$ the radius of the shaft. These holes are positioned preferably in staggered relation so as not to weaken the shaft. The packing Q of another stuffing box P', as shown in Fig. 6, surrounds the hollow shaft W at its upper end through which the furfural is added. This prevents the escape of oxygen at this point. Drive R rotates the shaft E' at the proper speed, but the portion W of the shaft does not rotate. The packing Q provides the proper connection between the rotating and the non-rotating shafts, while the valve V disposed slightly above on shaft W controls the feeding of furfural to tank A.

Oxygen is supplied at atmospheric pressure or very slightly above, the air being initially flushed from the apparatus with oxygen.

Using this apparatus and pure oxygen, the reaction may be speeded up. There also results a slightly higher grade product than is obtained with air. It will be obvious that my process can be operated under a wide range of conditions, it being essential only that furfural shall be brought into intimate contact with gaseous oxygen in an alkaline, liquid medium in the presence of the activating material. The conditions of temperature, alkalinity, and concentration specified in the examples given above are those which I consider preferable, but useful results can, of course, be obtained under a very wide range of modifications, both as to the specific processes described above as well as to the apparatus. It is to be understood that I desire that only such limitations be imposed upon my invention as are pointed out in the appended claims.

I claim:

1. A method of producing furoic acid which comprises oxidizing furfural with gaseous oxygen by means of an activator consisting predominantly of silver and in an alkaline liquid capable of reacting with furoic acid.

2. A method of producing furoic acid which comprises oxidizing furfural in contact with oxygen and an activator consisting predominantly of silver in an alkaline liquid capable of reacting with furoic acid.

3. A method of producing furoic acid which comprises dispersing oxygen in an alkaline liquid capable of reacting with furoic acid and containing furfural and a catalyst consisting predominantly of silver.

4. A method of producing furoic acid which comprises dispersing oxygen and a non-oxidizing gas in an alkaline liquid capable of reacting with furoic acid and containing furfural and a catalyst consisting predominantly of silver.

5. A method of producing furoic acid which comprises dispersing air in an alkaline liquid capable of reacting with furoic acid and in the presence of furfural and a catalyst consisting predominantly of silver.

6. A method of producing furoic acid which comprises suspending lime and a catalyst consisting predominantly of silver in water and intimately mixing therewith furfural and oxygen.

7. A method of producing furoic acid which comprises suspending lime and a catalyst consisting predominantly of silver in water and intimately mixing therewith furfural and air.

8. A method of producing furoic acid which comprises suspending lime and a catalyst consisting predominantly of silver in water and dispersing furfural and oxygen therein at such a rate that no substantial accumulation of furfural results.

9. In a method of producing furoic acid by oxidizing furfural by means of oxygen and a catalyst consisting predominantly of silver, the step of reactivating the catalyst for reuse by extraction with hot caustic solutions.

10. A method of producing a salt of furoic acid which consists in oxidizing liquid furfural with an oxygen containing gas in the presence of an alkaline liquid capable of reacting with furoic acid and a catalyst consisting predominantly of silver.

11. A method of producing sodium furoate which consists in oxidizing liquid furfural with an oxygen containing gas in the presence of sodium hydroxide and a catalyst consisting predominantly of silver.

12. In the preparation of furoic acid the step which consists in adding liquid furfural to an aqueous suspension of calcium hydroxide and a catalyst consisting predominantly of silver and simultaneously subjecting the mixture to the action of an oxygen containing gas.

LLOYD L. ISENHOUR.